United States Patent [19]

Steffen

[11] 4,363,819
[45] Dec. 14, 1982

[54] SAUSAGE-CASING LOADING METHOD AND CASING/SLEEVE COMBINATION THEREFOR

[76] Inventor: Remy A. E. Steffen, Aspres sur Buech, Hautes-Alpes, France

[21] Appl. No.: 175,920

[22] Filed: Aug. 6, 1980

[30] Foreign Application Priority Data

Aug. 8, 1979 [FR] France ............... 79 20735

[51] Int. Cl.³ ........................... A22C 13/00
[52] U.S. Cl. .................... 426/132; 426/138; 426/140; 426/413; 426/414; 426/284; 17/1 F; 17/49; 138/118.1; 206/802; 53/581
[58] Field of Search ............... 426/105, 138, 140, 135, 426/413, 414, 277, 284, 513, 516, 132; 206/802; 138/118.1; 17/41, 42, 49, 1 F, 35, 33; 53/581

[56] References Cited

U.S. PATENT DOCUMENTS

| 1,538,460 | 5/1925 | Brecht ................... 17/41 |
| 1,616,971 | 2/1927 | Henderson ............. 426/140 |
| 1,938,070 | 12/1933 | Friedler ................. 426/140 |
| 2,890,121 | 6/1959 | Rinehart ................ 426/140 |
| 3,115,240 | 12/1963 | Flomen et al. ......... 206/802 |
| 3,122,779 | 3/1964 | Blechschmidt ......... 17/41 |
| 3,148,991 | 9/1964 | Svendsen ............... 17/42 |
| 3,446,634 | 5/1969 | Stahlberger ........... 426/140 |
| 3,826,852 | 7/1974 | Levaco et al. ......... 426/140 |
| 3,952,370 | 4/1976 | Greider ................. 17/41 |

FOREIGN PATENT DOCUMENTS

| 537706 | 3/1957 | Canada ................. 426/140 |
| 2759005 | 7/1979 | Fed. Rep. of Germany ......... 17/42 |
| 1373697 | 7/1963 | France . |
| 516281 | 1/1972 | Switzerland ........... 17/42 |

Primary Examiner—Steven L. Weinstein
Attorney, Agent, or Firm—Karl F. Ross

[57] ABSTRACT

A sausage-casing/sleeve combination has a flexible synthetic-resin sleeve having a laterally open aperture, a pair of longitudinal ends, and a tear line extending longitudinally from this aperture to one of the ends. A plurality of sausage-casing sections having overlapping ends and longitudinally compressed accordion-fashion are carried on the sleeve between the aperture and the one end. This combination is made by fitting the sleeve over a mandrel tube, clamping the end of the sleeve at the tip of the mandrel tube, and then pulling the sections over the thus rigidified sleeve while ejecting water from the end of the sleeve to soften the sausage-casing sections. The overlapping ends may be stapled, glued, or sewn together.

14 Claims, 9 Drawing Figures

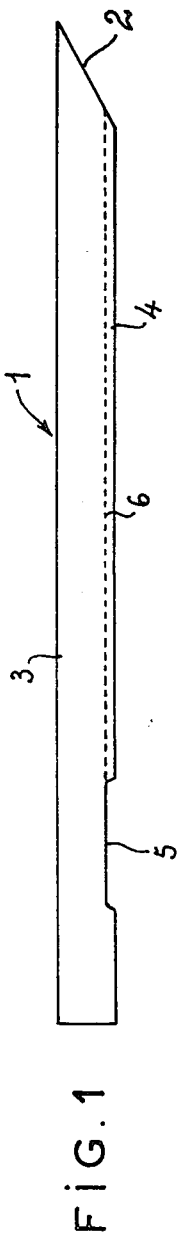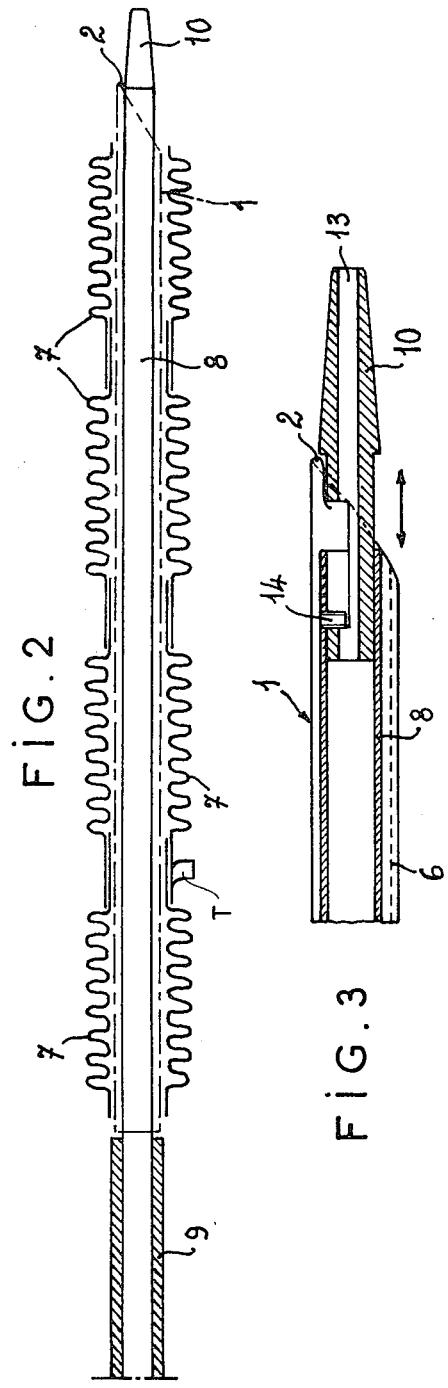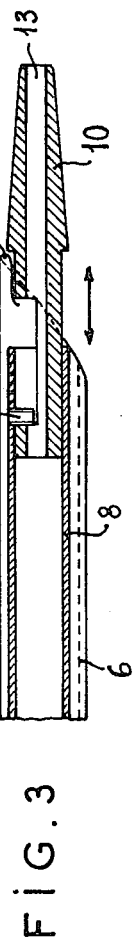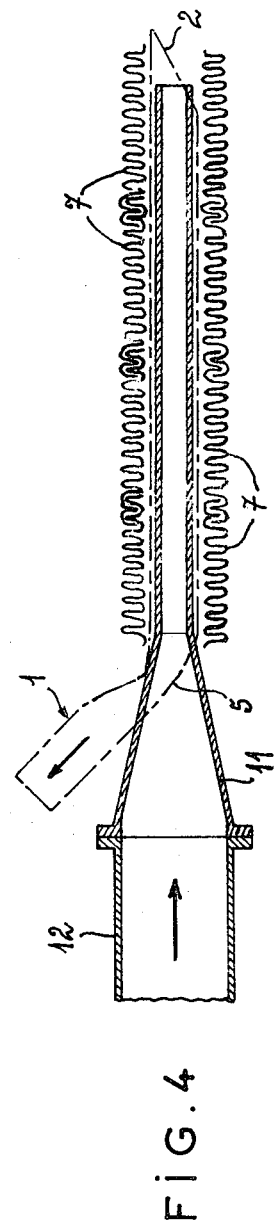

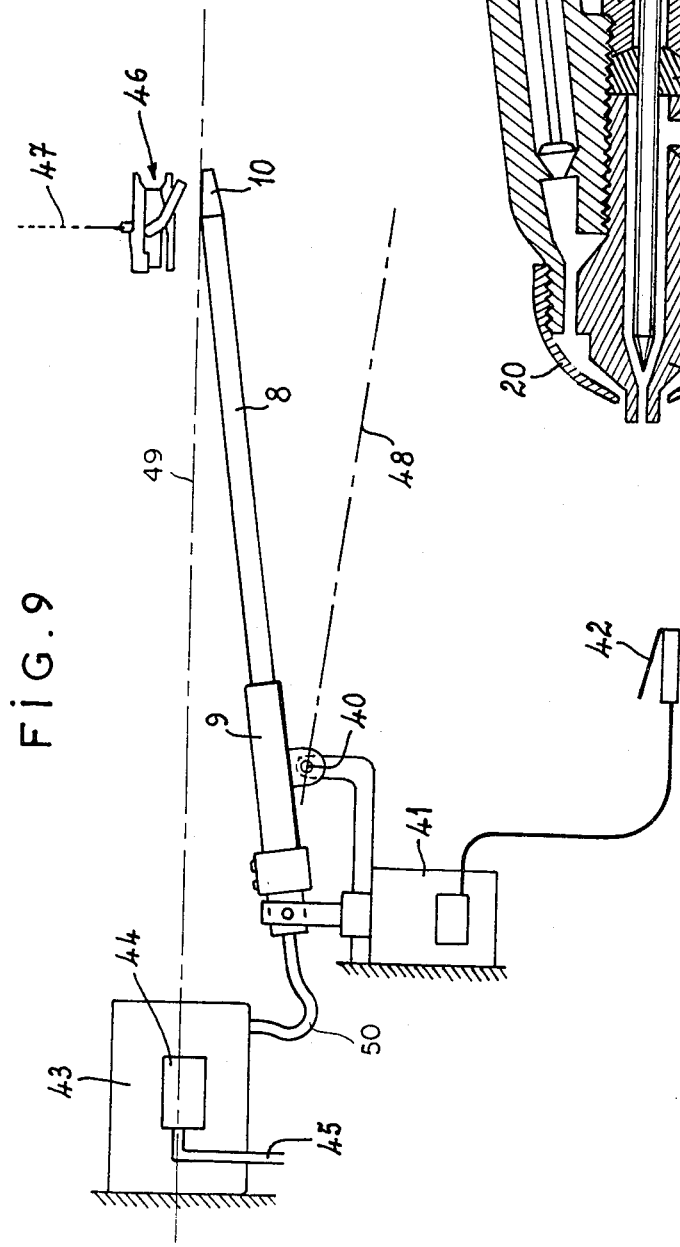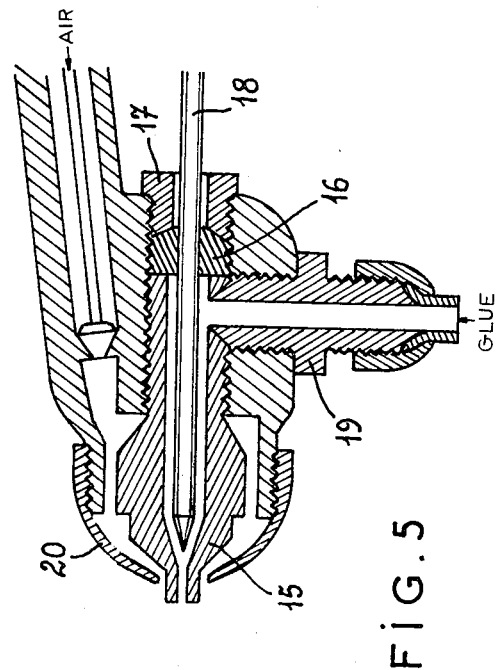

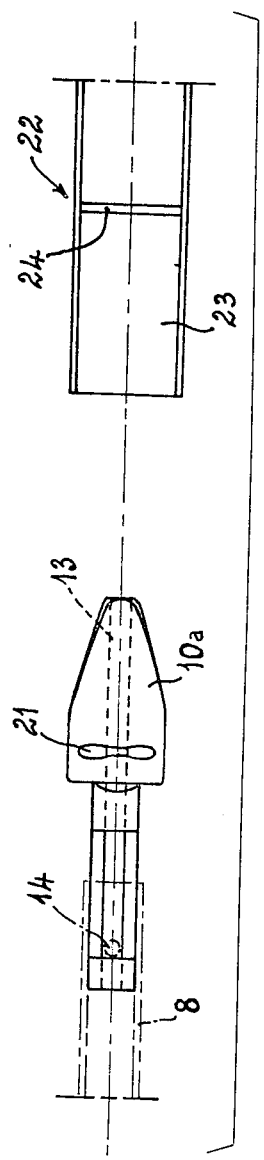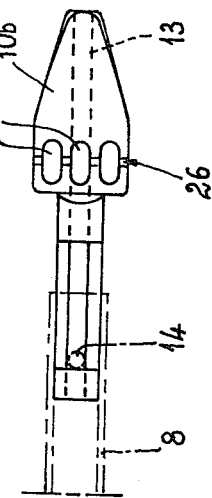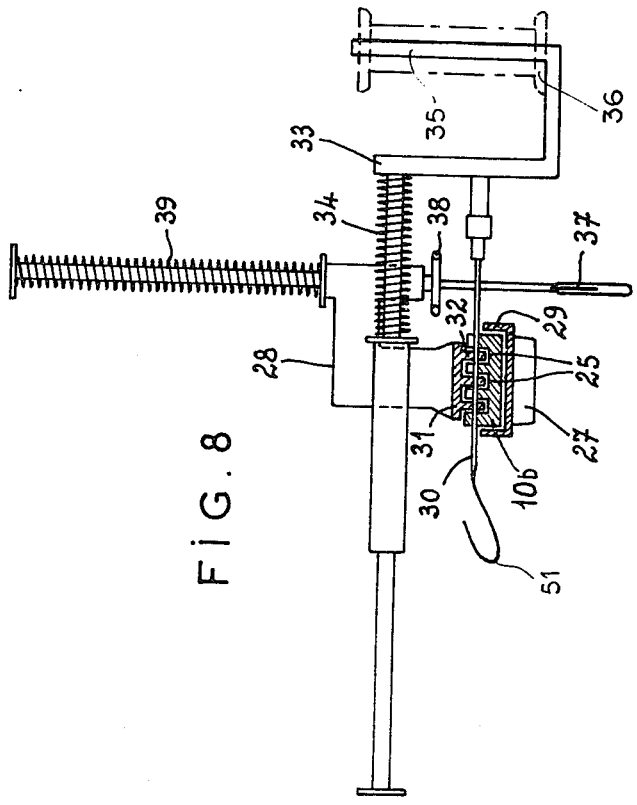
FIG. 6
FIG. 7
FIG. 8

SAUSAGE-CASING LOADING METHOD AND CASING/SLEEVE COMBINATION THEREFOR

FIELD OF THE INVENTION

The present invention relates to a method of loading sausage-casing sections onto the nozzle of a sausage-stuffing machine, to a sausage-casing package, and to an apparatus for making a sausage-casing package.

BACKGROUND OF THE INVENTION

The production of sausage using natural sausage casing is a relatively onerous job. The intestines used for the casing normally taper. Thus, whether these intestines be of beef, sheep, goat, or pigs, the slaughter house normally packages them for the butcher by cutting them up into sections and selling packages of sections of approximately the same diameter. To preserve them they are salted and normally wrapped in bundles that are tied with string.

In order to use the casings the butcher must open the package and soak the individual sections in water so as to desalt them and soften them. They are then fitted sequentially over the nozzle of the grinder or sausage-stuffing machine and compressed accordion-fashion.

It is also known to package the sausage-casing sections in a container filled with brine, with all of the sections carried on a ring. Such an arrangement eliminates the work of separating, desalting, and soaking the casing sections.

It is also known from my earlier French Pat. No. 1,373,697 to market the sausage-casing sections on a flexible and smooth polyethylene sleeve which is fitted over the nozzle of the sausage-stuffing machine. This arrangement substantially reduces the handling operations for the butcher, thereby saving considerable expense.

Even with the best of the above-described systems the actual operation of filling the casings with sausage meat or other stuffing is a relatively tricky job. Even when extreme care has been taken it is fairly common for the sausages to come apart at the joints between adjacent sausage-casing sections. Furthermore with my above-described earlier patent and system a common problem is that the polyethylene sleeve carrying the sausage casing sections is entrained by them as they are pulled off, or on the other hand prevents the sausage-casing sections from being pulled off the nozzle.

OBJECTS OF THE INVENTION

It is an object of this invention to provide an improved method of loading sausage-casing sections onto the nozzle of a sausage-stuffing machine.

Another object is to provide an improved sausage-casing package and apparatus for making it.

A further object is to provide such a method, package, and apparatus which eases the chore of making sausage with natural intestine casings.

SUMMARY OF THE INVENTION

These objects are attained according to the instant invention in a method wherein a succession of sausage-casing sections are fitted one after the other over a sacrificial synthetic-resin sleeve, with the ends of the sections overlapping on the sleeve. The sleeve carrying the succession of overlapping casing sections is then fitted backwardly over the nozzle of the sausage-stuffing machine, and then the sleeve is stripped backwardly from between the nozzle and the sections to leave the succession of overlapping casing sections on the nozzle.

Thus the instant invention envisages the production of a package of sausage-casing sections, either by the butcher or by a supplier, with the sausage-casing sections being arranged on a flexible synthetic-resin sleeve which has a laterally open aperture, a pair of longitudinal ends, and a tear line extending longitudinally from the aperture to one of the ends. The plurality of sausage-casing sections with overlapped ends are longitudinally compressed accordion-fashion on the sleeve between the aperture and the one end. Such a casing/sleeve combination or package can be salt-dried and stored for considerable time, or can be held in a brine-filled container for use at a later date. Either way it is possible to produce a sausage casing which can have an overall length of up to 50 meters, for mass production of sausage with natural casings.

Although the overlap of the ends of the sausage-casing sections itself largely prevents leakage at these ends, according to another feature of this invention the ends are secured together positively, that is they are mechanically secured together. This can either be done by means of an edible adhesive which is insoluble in water once dried, or by an actual mechanical connection such as stapling or sewing. If the filling is particularly liquid it has been found extremely advantageous to positively connect the ends of the sausage-casing sections together in this manner.

In accordance with this invention the butcher can in fact be supplied with a package which simply comprises the above-described flexible synthetic-resin sleeve which has a laterally open aperture, a pair of longitudinal ends, and a tear line extending longitudinally from the aperture to one of the ends. The overlapped sausage-casing sections surround this sleeve and are longitudinally compressed accordion-fashion between the aperture and the one end. In this form the sausage-casing sections can be supplied to the butcher, either dried or in a sealed brine-filled container. The inside diameter of the synthetic-resin sleeve exceeds the outside diameter of the nozzle over which it is to fit by 1 mm to 2 mm. The user need only fit this package over the sausage-machine nozzle, inserting the nozzle laterally through the aperture and pulling the sleeve back over the nozzle until the outer end of the nozzle lies at the outer end of the sleeve, then with continued pulling the sleeve will tear and pull out from between the sausage-casing sections and the nozzle, leaving the sections on the nozzle.

The apparatus for carrying out the method according to this invention has a support, a mandrel tube having a rear end secured to the support and a front end, a pointed and longitudinally perforated tip at the front end, means for securing the one end of the sleeve at the tip with the sleeve extending horizontally from the tip toward the rear end, and means for ejecting a liquid from the tip. Thus as the sausage-casing sections are drawn backwardly over the tip onto the tube they are internally wetted. Thereafter the entire package can be removed from the mandrel tube and salt-dried as described above. The means for ejecting the liquid can include a reservoir holding liquid at a predetermined level and the support can be tippable between a position with the front end of the mandrel tube lying below this level and a position with it lying above the level. A conduit connected to the rear end of the mandrel tube will therefore gravity-feed water to the tip when it is in the lower position and will prevent such feeding when in the upper position, making the device extremely simple and easy to operate.

By positively connecting together the ends of the sausage-casing sections it is possible to use an external-mix spraygun with a cyanoacrylate adhesive, in which case all the glue-contacting internal parts of the gun should be covered with teflon and the tip should have a diameter of at least 4 mm. Otherwise edible adhesives such as vinylethylene can be used, in which case at least the joint portions of the sausage-casing sections must be left stretched out and flat on the tube for a brief time to allow the adhesive to dry.

If a positive mechanical connection is achieved by stapling or sewing the tip of the package-assembling apparatus is made to coact with the stapling or sewing machine. In a stapling machine the tip is merely provided with staple-bending recesses like the anvil of a stapler, and the stapler is provided with a seat that holds this tip in the appropriate position for stapling. Such a stapling method can advantageously be combined with a marking system whereby tags are stapled to the casing sections to identify their types, diameters, or other characteristics, these tags also serving to identify where the staples are for subsequent removal.

When the tip is formed to coact with a sewing device it is provided with a plurality of recesses traversed by a groove. A jaw of the sewing machine has a plurality of bosses that interfit with these recesses and that are also formed with a traversing groove that is alignable with the groove of the tip. A needle can be poked through the folds in the casing sections formed by interfitting of the bosses and the grooves and can insert a thread through these folds leaving it extending approximately 5 cm in each direction.

DESCRIPTION OF THE DRAWING

FIG. 1 is a side view of the sacrificial tube used in the method and system of the instant invention;

FIG. 2 is a side partly sectional view illustrating how a package according to this invention is made;

FIG. 3 is a large-scale view of a detail of FIG. 2;

FIG. 4 is a side sectional view illustrating how a package according to this invention is used;

FIG. 5 is an axial section through a glue sprayer according to this invention;

FIG. 6 shows an arrangement for stapling sausage-casing sections together according to this invention;

FIG. 7 is a side view of a tip usuable with a sewing machine according to this invention;

FIG. 8 is the sewing machine usuable with the tip of FIG. 7; and

FIG. 9 is a side largely schematic view illustrating further details of the package-assembling apparatus of the instant invention.

SPECIFIC DESCRIPTION

As seen in FIG. 1 a polyethylene tube 1 has a diagonally cut front end 2 and a pair of longitudinal edges 3 and 4. The edge 4 has a laterally open hole or aperture 5. A weakened perforated or tearline 6 is provided extending along the edge 4 between the aperture 5 and the end 2.

According to this invention a plurality of natural-intestine sausage-casing sections 7 are mounted on this sleeve 1 by fitting the sleeve 1 over a mandrel tube 8 having a rear end carried in a support 9 and a front end provided with a point or tip 10. This tip 10 has a longitudinally throughgoing hole 13 and can slide limitedly relative to the front end of the mandrel tube 8, its longitudinal motion being limited by a stop 14. Thus a sleeve 1 having a diameter 1 mm–2 mm larger than that of the mandrel 8 and tip 10 can be fitted over this mandrel 8 and its outer end 2 can be clamped or pinched in place by means of the sliding tip 10.

Once thus mounted on the tube 8, sausage-casing sections can be pulled over the tip 10 and folded up accordion-fashion with their ends overlapping.

FIG. 9 shows how the support 9 can be pivotal about a horizontal axis 41, its pivoting being controlled by an actuator 41 controlled in turn by a pedal 42. A reservoir 43 having a float 44 that allows water to enter via a tube 45 when the level in the reservoir drops below a level 49 is connected via a flexible conduit 50 to the support 8 and, through it, to the interior of the mandrel tube 8. When in the solid-line raised position water will barely issue from the hole 13 and the tip 10, but when lowered as indicated at line 48 water will be gravity-fed to the tip 10. This water issuing relatively slowly from the tip 10 will wet the sausage-casing sections and allow them easily to be pulled over the sleeve 1 clamped thereon by the tip 10.

This forms a package comprising a plurality of sausage-casing sections 7 carried on the sleeve 1. This package can be canned in brine and held an almost indefinite time, can be dried out and marketed in dry condition, or can be prepared by the butcher just prior to making a large batch of sausage. In any case once it is made the package is shortened so that even the joints of the casing sections 7 are folded up accordion-fashion as seen in FIG. 4. The sleeve 1 is then fitted iover the end of a nozzle or filling tube 11 of a sausage-making machine or meat grinder 12 by insertion of the end of this nozzle 11 into the hole 5. The length from the hole 5 to the end 2 is approximately equal to the length of the nozzle 11 so that the sleeve 1 is pulled all the way back on the nozzle 11 all of the casings 7 will also surround the nozzle 11. Continued pulling will split the sleeve 11 along the tearline 6 and allow the sleeve 1 to be withdrawn backwardly as indicated by the arrow in FIG. 4.

For stuffing sheep intestines having a diameter of about 14 mm the sleeve 1 has a diameter of 15 mm. For stuffing sheep intestines having an outside diameter of 16 mm the diameter is increased to 17 mm. For pork intestined having outside diameter of 20 mm, the interior diameter of the sleeve 1 is 22 mm, and for sheep intestines having an outside diameter of 28 mm the interior diameter is 30 mm. For beef intestines having an outside diameter of 34 mm the interior diameter is 36 mm and similarly for beef intestines having an outside diameter of 38 mm the internal diameter of the sleeve 1 is 40 mm. The sections 7 normally overlap by approximately 15 cm.

It is possible to join together the overlapping casing ends by means of cyanoacrylate adhesive using a spray nozzle such as shown in FIG. 5. Here an external-mix nozzle has a core 15 in which a needle valve body 18 is secured by a seal 16 and packing nuts 17. Glue is fed in via an inlet coupling 19 and air via a shroud cup 20. All the inner parts of this nozzle which contact the cyanoacrylate glue are coated with teflon and the nozzle 15 protrudes at least 2 mm beyond the cup 20 to prevent fouling of the tool.

It is also possible to use an edible vinylethylene adhesive or other adhesive which is insoluble in water after it dries. In this case the nozzle shown in FIG. 5 can be made entirely from aluminum. In such an arrangement the sleeve 1 is normally around 20% longer than that used with the fast-drying cyanoacrylate glue to allow the overlapping ends to lie flat during drying of the glue. A conveyor-belt dryer can heat the packages to 35° to dry them, or a heated pincher can be provided having jaws at a temperature of around 50° C. and of a width of approximately 25 mm to quickly cure the adhesive and the joint. In such a system the remaining drying takes place simply in the air, with nonetheless the joints remaining flat during such final drying to which end the sleeve 1 is of extra length as described above.

It is also possible to use as shown in FIG. 6 a spade-shaped tip 10a having staple-bending recesses 21. A stapler 46 such as shown suspended by an elastic cord 47 in FIG. 9 is employed which has a seat 22 forming a hole 23 adapted to receive the tip 10a and provided with a stop 24 so that the staples that will be inserted at the recesses 21 will have their legs bent in. A tag such as shown at T in FIG. 2 can simultaneously be attached to the sausage-casing section 7 at the joint to mark the sizes thereof or indicate other characteristics of the products. These tags T also make it easy to locate the staples and remove them prior to eating the sausages produced according to this invention.

It is also possible as shown in FIG. 8 to use a tip 10b having three recesses 25 traversed by a groove 26. To use this tip 10b it is positioned with the overlapping casing ends at the recesses 25 and the tip 10b is held between flanges 29 of a lower jaw of support 27 under a vertically displaceable upper jaw 28. This jaw 28 has a lower end 31 formed with a plurality of bosses 32 that can interfit with the recesses 25 and that are formed with a groove traversing these bosses 32 like the groove 26. A needle 30 carrying a thread 51 can be inserted through these grooves 26 to pierce three folds of the casings 7 at the joint between them. To this end the needle 30 is carried on a support 33 urged away from the jaws 27 and 28 by spring 34. This support 33 has a pin 35 carrying a spool 36 of the thread 51. In addition the device is provided with a fixed blade 37 and a movable fork 37 urged upwardly by a spring 39 and provided between the support 33 and the jaws 27 and 28.

The needle can be advanced all the way through the folds in the section joints as described above and then retracted fully backwardly so that the thread 51 is left extending between the tip 10b and the end of the needle 30. The plunger above the spring 39 is then depressed to push the thread 51 down over the blade 37 and sever the thread 51, leaving approximately 5 cm of thread 51 projecting from the needle 30, and approximately 5 cm hanging from each side from the sewed pleats in the joint. This forms between two sausage casings an extremely neat and secure positive connection which can be made very inexpensively. Furthermore the thread 51 can readily be removed at a later date by grasping and pulling either of its extending ends.

Thus with the system according to the instant invention it is possible in an extremely simple manner to make a package of a plurality of sausage-casing sections which allows a sausage manufacturer to produce a continuous length of as long as 50 meters of sausage. The sausage-casing sections can easily be loaded onto the nozzle of the meat grinder or sausage-stuffing machine. The package can either be made up by the butcher or can be sold to him as is, so as to facilitate his work.

I claim:

1. A method of loading sausage-casing sections onto the nozzle of a sausage-stuffing machine,
    said casing sections being carried on a flexible synthetic-resin sleeve having a laterally open aperture, a pair of longitudinal ends, and a tear line extending longitudinally from said aperture to one of said ends,
    said sections having overlapping ends and being longitudinally compressed accordion-fashion on said sleeve between said aperture and said one end;
    said method comprising the steps of:
        fitting the sleeve carrying the succession of overlapped casing sections backwardly over said nozzle by inserting said nozzle into said sleeve through said aperture toward said one end; and
        thereafter stripping said sleeve from between said nozzle and said sections to split said sleeve along said tear line and leave said succession of overlapped casing sections on said nozzle.

2. The method defined in claim 1 wherein said nozzle has a tip and said sections all have outer ends relatively close to said tip and inner ends relatively far from said tip, said inner ends lying outside the respective outer ends they overlap.

3. The method defined in claim 2 wherein said sleeve is stripped from said nozzle by being withdrawn backwardly and torn longitudinally.

4. The method defined in claim 2, further comprising the steps of salt-drying and storing said succession of overlapped casing sections with said sleeve before fitting same over said nozzle.

5. The method defined in claim 2, further comprising the step of positively securing together the overlapped ends of said sections prior to fitting said sleeve over said nozzle 6. The method defined in claim 5 wherein said overlapped ends are secured positively together by means of a cyanoacrylate adhesive.

7. The method defined in claim 5 wherein said overlapped ends are secured together positively by means of an edible adhesive which is insoluble in water once dry.

8. The method defined in claim 5 wherein said overlapped ends are secured together positively by stapling.

9. The method defined in claim 8, further comprising the step of securing marking tags to said overlapped ends with the staples securing same together.

10. The method defined in claim 5 wherein said overlapped ends are secured together positively by sewing.

11. In combination:
    a flexible synthetic-resin sleeve having a laterally open aperture of a size sufficient for insertion of a nozzle of a sausage-stuffing machine into said sleeve through said aperture, a pair of longitudinal ends, and a tear line extending longitudinally from said aperture to one of said ends; and
    a plurality of sausage-casing sections having overlapping ends and longitudinally compressed accordion-fashion on said sleeve between said aperture and said one end.

12. The combination defined in claim 11 wherein each of said sections has an outer end relatively close to said one end and an inner end relatively far from said one end, said inner ends overlapping the respective outer ends.

13. The combination defined in claim 11, further comprising means for permanently securing together the overlapping ends of said sections.

14. The combination defined in claim 11 wherein said one end has an end edge extending at an acute angle to said sleeve.

* * * * *